Aug. 25, 1959 R. L. OSWALD Re. 24,692

OPTIONAL GUN SIGHT RETICULE ENLARGING DEVICE

Original Filed Nov. 5, 1953 2 Sheets-Sheet 1

RICHARD L. OSWALD,
INVENTOR.

BY O D Martin

ATTORNEY.

OPTIONAL GUN SIGHT RETICULE ENLARGING DEVICE

Original Filed Nov. 5, 1953 2 Sheets-Sheet 2

RICHARD L. OSWALD,
INVENTOR.

BY O. O. Martin,

ATTORNEY.

United States Patent Office

Re. 24,692

Reissued Aug. 25, 1959

24,692

OPTIONAL GUN SIGHT RETICULE ENLARGING DEVICE

Richard L. Oswald, Los Angeles County, Calif., assignor to David P. Bushnell, Pasadena, Calif.

Original No. 2,769,239, dated November 6, 1956, Serial No. 390,313, November 5, 1953. Application for reissue May 23, 1958, Serial No. 737,464

9 Claims. (Cl. 33—50)

Matter enclosed in heavy brackets [ ] appears in the original patent but forms no part of this reissue specification; matter printed in italics indicates the additions made by reissue.

This invention relates to gun sights and has particular reference to telescopic gun sights. Rifle telescopic sights of the conventional type are used both in target practice and in the field. These telescope sights are usually equipped with reticules having horizontal and vertical cross-hairs. *Reticules in general consist of two types, one in which a pair of filaments or "hairs" extend perpendicularly across the field to form "cross hairs" which are unsupported except at their ends, and the other type in which a transparent member is etched or engraved to provide a pair of intersecting lines that appear and function as "cross hairs." The present invention applies to both types of reticules and "cross hairs" or "cross strands." Reticule cross hairs* [Reticules] that cover a minute of angle or less are preferred for accurate sighting and are entirely satisfactory in target practice where light conditions are uniformly good and the gunner can move slowly to aim his rifle. There are times, however, particularly in hunting, where light conditions are poor and frequently the target is moving so rapidly that instantaneous sighting is imperative. Under such conditions it is well nigh impossible to find time not only to move the rifle into aiming position but also for the eye to find the center of the very fine reticule.

It is in view of the foregoing the object of the present invention to provide a device for instantly changing the size of a telescopic sight reticule center when such unfavorable conditions are encountered. A further object is to provide a device which normally is held in a retracted out-of-the-way position, but which may be quickly moved into operative position more clearly to define the reticule center.

These and other objects of the invention, as well as the many advantageous features thereof, will become apparent upon perusal of the following detailed description and by referring to the accompanying drawing in which a preferred form of the invention is illustrated.

The device of the invention is in any suitable manner mounted within a conventional telescope sight, a portion of the tubular casing of which is indicated at 1.

Figure 1:
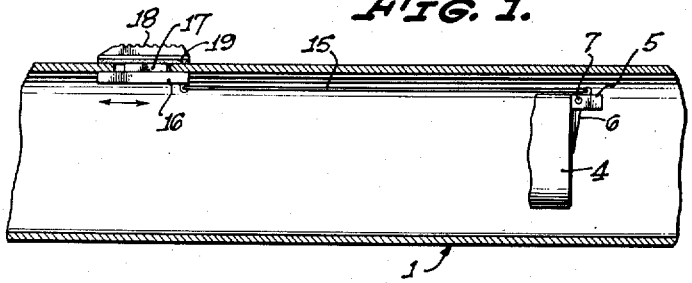
Fig. 1 is a cross-sectional view of a portion of a gun sight telescope tube within which the device of the invention is mounted.
Figure 2:
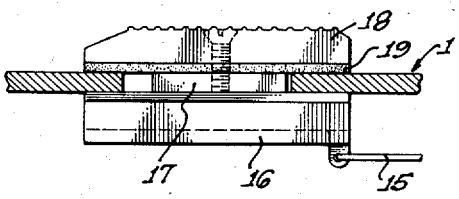
Fig. 2 shows, on a larger scale, the manner in which operating elements of the device are mounted on the tube.
Figure 3:
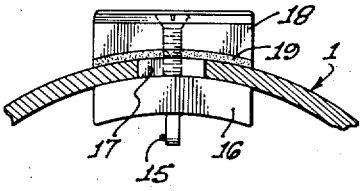
Fig. 3 is an end view of the parts shown in Fig. 2.
Figure 4:
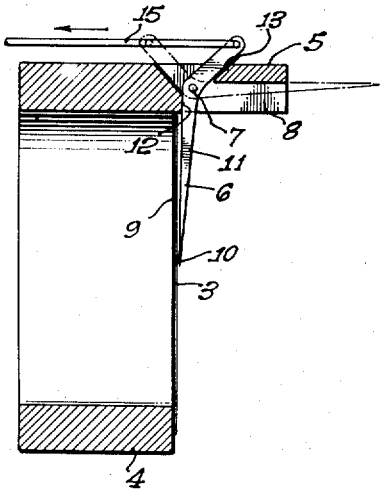
Figs. 4 and 5 show other parts of the device.

The reticule 3 of the telescope sight is mounted within a reticule support 4 which in any conventional manner, not shown, is mounted for adjustment correctly to define the line of sight of the telescope. The wall of the reticule support is in the drawing shown extended to provide an anchoring place 5 for a lever 6. The latter is shown hung on a pivot 7 for oscillating movement within a slot 8 of the support to swing the lever into the full outline position of Fig. 4 as close as possible to and parallel with the vertical strand 9 of the reticule.

Figure 5:
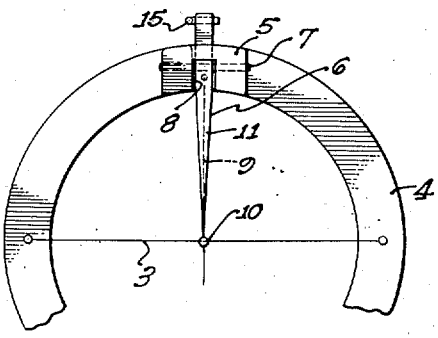

The lever terminates at the bottom in a *head 10* [circular disk 10 forming a head] which may be [termed a dot reticule, the center of which] *in the form of a circular disk that* takes a position in axial alinement with the reticle center when the lever is swung into the full line position and it is merely large enough [in diameter] to be more clearly visible to the gunner than the intersection of the fine cross-hairs when the rifle is swung into aiming position. The lever is in Fig. 5 at 11, for the purpose of strength, shown wider at the pivotal point thereof and downwardly tapering to terminate in a fine line next to the head 10.

The other end of the lever is by a rod 15 connected with a plate 16 which, in turn, is seated for lengthwise sliding movement within the wall of the telescope tube. This plate is by a spacer 17 connected with a finger-piece, or shoe 18 which may be manually moved along the surface of the telescope tube to operate the lever. The length of the opening through the tube wall, in which the spacer 17 is seated, should be calculated to provide the spacer sufficient movement to swing the lever from one position to the other. The exact arc of travel of the lever is determined by the surfaces 12, 13 of the slot 8. It is also advisable to mount a soft, compressible pad 19 below the finger-piece 18 in order to provide a light and air-tight joint between this slide assembly and the telescope tube.

Figure 6:
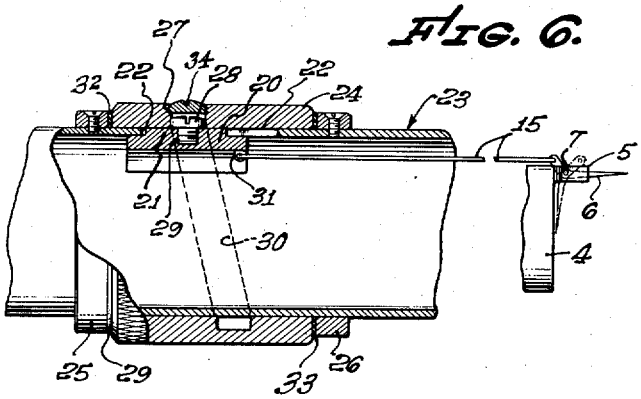
Figs. 6 and 7 illustrate a modified manner of operating the device of the invention.
Figure 7:
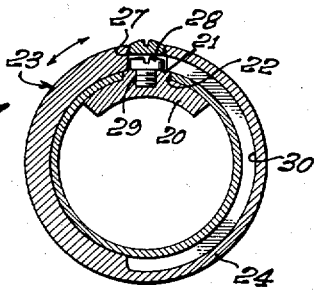

It is seen from the foregoing description that I have provided a very simple reticule center enlarging device which may be embodied in conventional reticule equipped telescopic gun sights in such convenient manner that it may be instantly brought into service by a simple movement of a finger. And while the above described method of actuating the reticule lever is found preferable in most cases it may at times be found convenient to substitute a rotating movement for the sliding movement of the finger-piece 18. This modification is illustrated in Figs. 6 and 7 of the drawings.

A plate 20, somewhat similar to plate 16, is mounted for sliding movement within the telescope tube 23 and it is, like plate 16, made with a projection 21 seated in a slot 22 of the tube. A sleeve 24 is mounted for rotation on the tube between fixed collars 25, 26 and a hole 27 is cut through this sleeve of a size to receive therein a screw 28. The threaded shank of this screw engages the threads of a socket 29 of the plate projection 21 to maintain the plate in position against the inner surface of the tube. The sleeve is at 30 shown internally recessed to form a helical groove extending from the hole 27 about one-half the distance around the inner surface of the tube. A boss 31 projects inwardly from one end of the plate 20 and this boss is shown perforated to receive one end of the connecting rod 15. Rotation of this sleeve, within the limits of the helical groove 30, will impart sufficient axial movement to the plate 20 to swing the lever 6 on its pivot for the purpose above described. The joints between the sleeve and the collars 25, 26 may be sealed by means of gaskets 32, 33 and the entrance to the hole 27 of the sleeve may be plugged as indicated at 34 to prevent penetration of air and light into the tube.

Figure 8:
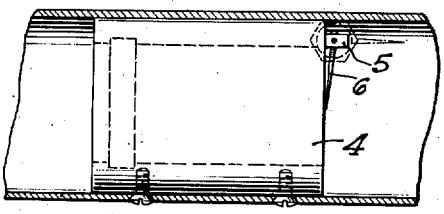
Figs. 8 and 9 show a further modification thereof.
Figure 9:
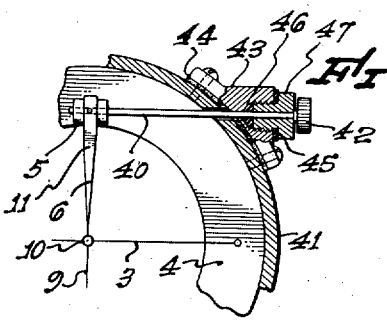

In other cases, it may be found preferable directly to connect the reticule lever for manual rotation and such combination is illustrated in Figs. 8 and 9 of the drawings. The pivot 7 of the lever is in this case shown extended to form a shaft 40 which extends through the wall 31 of the telescope tube and a knob 32 is fastened to the outer end of this shaft. Manual rotation of this shaft will swing the lever into and out of operative position. A bearing bracket 43 is shown mounted on the tube for extension of the shaft 40 therethrough and a gasket 44 is placed below this bracket to provide a light and air-tight seal. The outer opening of the bracket may be tightly sealed by means of gaskets 45, 46 which by a bushing 47 are held tightly compressed.

The above description, in connection with the illustrations in the drawings should be sufficient to enable anyone versed in the art to construct a complete operative device including the invention. But while I have illustrated and described preferred forms of the invention I do not intend thereby to be limited to the arrangements and proportions exactly as shown but reserve the right to embody modifications thereof within the scope of the claims hereto appended.

I claim:

1. A device for increasing the visibility of a telescopic gun sight reticule center comprising, a support for the reticule cross-strands mounted within the telescope tube, a lever pivotally mounted on the end of the support, a lever operating element mounted on the outer surface of the telescope tube, and connections between said element and the lever, said element being manually operable to swing the lever inwardly to bring the head thereof into axial alinement with the cross-strand intersection of the reticule.

2. A device for increasing the visibility of a telescopic gun sight reticule center comprising, a support for the reticule cross-strands mounted within the telescope tube, a lever pivotally mounted on the end of the support for oscillating movement within predetermined limits, a lever operating element mounted on the outer surface of the telescope tube, and connections between said element and the lever, said element being manually operable to swing the lever inwardly to bring the head thereof into axial alinement with the cross-strand intersection of the reticule.

3. A device for increasing the visibility of a telescopic gun sight reticule center comprising, a support for the reticule cross-strands mounted within the telescope tube, a lever terminating at one end thereof in a circular head, the lever being pivotally mounted on the end of the support, a lever operating element mounted on the outer surface of the telescope tube, connections between said element and the lever, the element being manually operable to swing the lever inwardly to bring the head thereof into axial alinement with the cross-strand intersection of the reticule, and gaskets between the element and the telescope tube to provide a light and air-tight joint therebetween.

4. A device for increasing the visibility of a telescopic gun sight reticule center comprising, a support for the reticule cross-strands mounted within the telescope tube, the support being axially slotted at one end thereof, a lever terminating at one end thereof in a circular head, the lever being pivotally mounted in the slot of the support, a lever operating element mounted on the outer surface of the telescope tube for axial sliding movement thereon, and connections between said element and the lever, said element being manually operable to swing the lever inwardly to bring the head thereof into axial alinement with the cross-strand intersection of the reticule.

5. A device for increasing the visibility of a telescopic gun sight reticule center comprising, a support for the reticule cross-strands mounted within the telescope tube, the tube having an elongated axially directed opening therethrough, a lever terminating at one end thereof in a circular head, the lever being pivotally mounted on the support, a lever operating element including a plate within the tube having a boss seated for sliding movement in said opening and a finger-piece on said boss riding on the outer surface of the tube, the plate having at one end thereof an inwardly directed lip, and a connecting link between the lever and the said lip, the finger-piece being manually movable on the tube within the limits of said opening to swing the lever inwardly to bring the head thereof into axial alinement with the cross-strand intersection of the reticule.

6. A device for increasing the visibility of a telescopic gun sight reticule center comprising, a support for the reticule cross-strands mounted within the telescope tube, the tube having an elongated axially directed opening therethrough, a lever terminating at one end thereof in a circular head, the lever being pivotally mounted on the support, a lever operating element including a plate within the tube having a boss seated for sliding movement in said opening and a finger-piece on said boss riding on the outer surface of the tube, the plate having at one end thereof an inwardly directed lip, a connecting link between the lever and the said lip, the finger-piece being manually movable on the tube within the limits of said opening to swing the lever inwardly to bring the head thereof into axial alinement with the cross-strand intersection of the reticule, and a gasket between the element and the telescope tube to provide a light and air-tight joint therebetween.

*7. A device for increasing the visibility of a telescopic gun sight reticule center comprising: reticule cross-strands mounted within the telescope tube; a lever having a free end and mounted within said tube for selective movement from a first position wherein said free end is axially aligned with, and in substantially the same plane as the intersection of said cross-strands, to a second position removed therefrom; and means connected to said lever and operable from the exterior of said tube for moving said lever between said positions.*

*8. A device for increasing the visibility of a telescopic gun sight reticule center comprising: reticule cross-strands mounted within the telescope tube; a lever having a head thereon mounted within said tube for selective movement from a first position wherein said head is axially aligned with, and in substantially the same plane as, the intersection of said cross-strands, to a second position removed therefrom; and means connected to said lever and operable from the exterior of said tube for moving said lever between said positions.*

*9. A device for increasing the visibility of a telescopic gun sight reticule center comprising: reticule cross-strands mounted within the telescope tube; a lever having a head thereon mounted within said tube for selective movement from a first position wherein said head is axially aligned with, and in substantially the same plane as, the intersection of said cross-strands, to a second position removed therefrom, said head being of a size and shape to indicate more clearly the location of the intersection of said cross-strands; and means connected to said lever and operable from the exterior of said tube for moving said lever between said positions.*

References Cited in the file of this patent or the original patent

UNITED STATES PATENTS

| | | |
|---|---|---|
| 870,610 | Bassell et al. | Nov. 12, 1907 |
| 2,155,390 | Arden | Apr. 25, 1939 |
| 2,452,592 | Meyer | Nov. 2, 1948 |